United States Patent
Kreibig

(10) Patent No.: US 9,962,639 B2
(45) Date of Patent: May 8, 2018

(54) FILTER ELEMENT HAVING AT LEAST ONE MAT-TYPE OR SHEET-TYPE FILTER WEB

(75) Inventor: Micha Kreibig, Rehlingen-Siersburg (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 1128 days.

(21) Appl. No.: 13/261,691

(22) PCT Filed: Jan. 17, 2012

(86) PCT No.: PCT/EP2012/000165
§ 371 (c)(1),
(2), (4) Date: Aug. 6, 2013

(87) PCT Pub. No.: WO2012/097973
PCT Pub. Date: Jul. 26, 2012

(65) Prior Publication Data
US 2013/0306548 A1    Nov. 21, 2013

(30) Foreign Application Priority Data
Jan. 18, 2011    (DE) .................. 10 2011 009 325

(51) Int. Cl.
*B01D 39/16* (2006.01)
*B01D 39/14* (2006.01)
(Continued)

(52) U.S. Cl.
CPC ............ *B01D 39/14* (2013.01); *B01D 29/111* (2013.01); *B01D 39/1623* (2013.01);
(Continued)

(58) Field of Classification Search
CPC .................. B01D 39/14; B01D 39/1623; B01D 46/0001; B01D 29/111; B01D 2201/52;
(Continued)

(56) References Cited

U.S. PATENT DOCUMENTS 3,746,595 A * 7/1973 Leason ................. B01D 29/111
156/245
4,929,354 A * 5/1990 Meyering ............ B01D 63/061
210/321.61

(Continued)

FOREIGN PATENT DOCUMENTS

DE       693 16 647 T2    7/1998
DE   10 2006 054 864 A1   5/2008
(Continued)

*Primary Examiner* — Madeline Gonzalez
(74) *Attorney, Agent, or Firm* — Wenderoth, Lind & Ponack, L.L.P.

(57) ABSTRACT

A filter element has a mat-type or sheet-type filter web (3) forming by its outside (5) at least in part a filter jacket (7). Along the outside (5) of the filter jacket (7), a surface configuration or modification takes place with structures (11) being delimited from the remaining surface (9) of the filter web (3), being joined to the filter jacket (7) and being of presettable contour and/or thickness. The structures (11) are generated by spray-fiber application and shaping, in such a manner that in time sequence, first the structures (11) and then the filter jacket (7), or in reverse order in time sequence, first the filter jacket (7) and then the structures (11), or that simultaneously both the filter jacket (7) and the structures (11) are formed in negative or positive shape on the filter jacket (7). The production of the filter element and a shaping device used in this production process are disclosed.

31 Claims, 6 Drawing Sheets

(51) Int. Cl.
*B01D 29/11* (2006.01)
*B01D 46/00* (2006.01)
*B29C 33/42* (2006.01)
*B29C 45/14* (2006.01)
*B29C 45/37* (2006.01)
*B29L 31/14* (2006.01)

(52) U.S. Cl.
CPC ........ *B01D 46/0001* (2013.01); *B29C 33/424* (2013.01); *B29C 45/14786* (2013.01); *B29C 45/372* (2013.01); *B01D 2201/188* (2013.01); *B01D 2201/52* (2013.01); *B01D 2201/60* (2013.01); *B01D 2239/065* (2013.01); *B01D 2239/069* (2013.01); *B01D 2239/0622* (2013.01); *B01D 2239/0654* (2013.01); *B01D 2239/10* (2013.01); *B01D 2239/1208* (2013.01); *B01D 2275/10* (2013.01); *B01D 2275/20* (2013.01); *B01D 2275/30* (2013.01); *B01D 2275/50* (2013.01); *B29L 2031/14* (2013.01)

(58) Field of Classification Search
CPC ......... B01D 2239/10; B01D 2201/188; B01D 2239/065; B01D 2275/10; B01D 2239/069; B29C 33/424; B29C 45/372; B29C 45/14786

USPC .. 210/488–490, 495, 496, 497.01, 455, 437, 210/457, 232, 485, 491, 503, 505, 508, 210/499; 425/385; 264/293, DIG. 48, 264/328.1, 509; 55/486, DIG. 5
See application file for complete search history.

(56) References Cited

U.S. PATENT DOCUMENTS

| | | |
|---|---|---|
| 5,425,907 A | 6/1995 | Gross et al. |
| 5,928,588 A | 7/1999 | Chen et al. |
| 6,015,452 A | 1/2000 | Nepsund et al. |
| 7,438,812 B2 * | 10/2008 | Denton .................. B01D 17/00 210/485 |
| 7,771,503 B2 * | 8/2010 | Poulsen ............. B01D 46/0001 210/437 |
| 2003/0168396 A1 | 9/2003 | Jacobson |
| 2007/0271887 A1 * | 11/2007 | Osborne ............ B01D 46/0001 55/495 |
| 2013/0075960 A1 * | 3/2013 | Hatakeyama ........... B29C 49/02 264/484 |

FOREIGN PATENT DOCUMENTS

| | | |
|---|---|---|
| DE | 10 2009 006 058 B3 | 7/2010 |
| EP | 0 855 208 A2 | 7/1998 |
| WO | WO 2005/087347 A1 | 9/2005 |

* cited by examiner

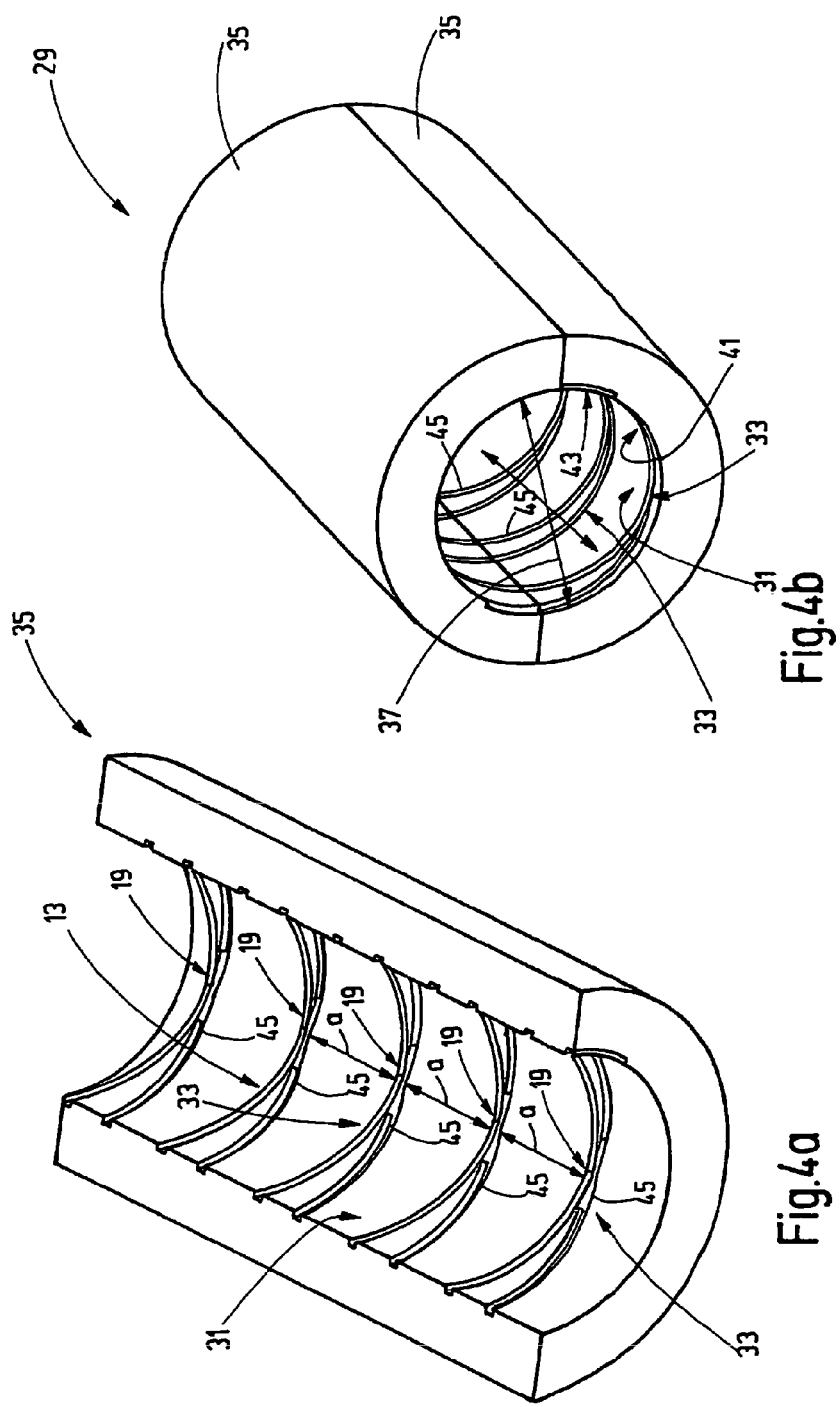

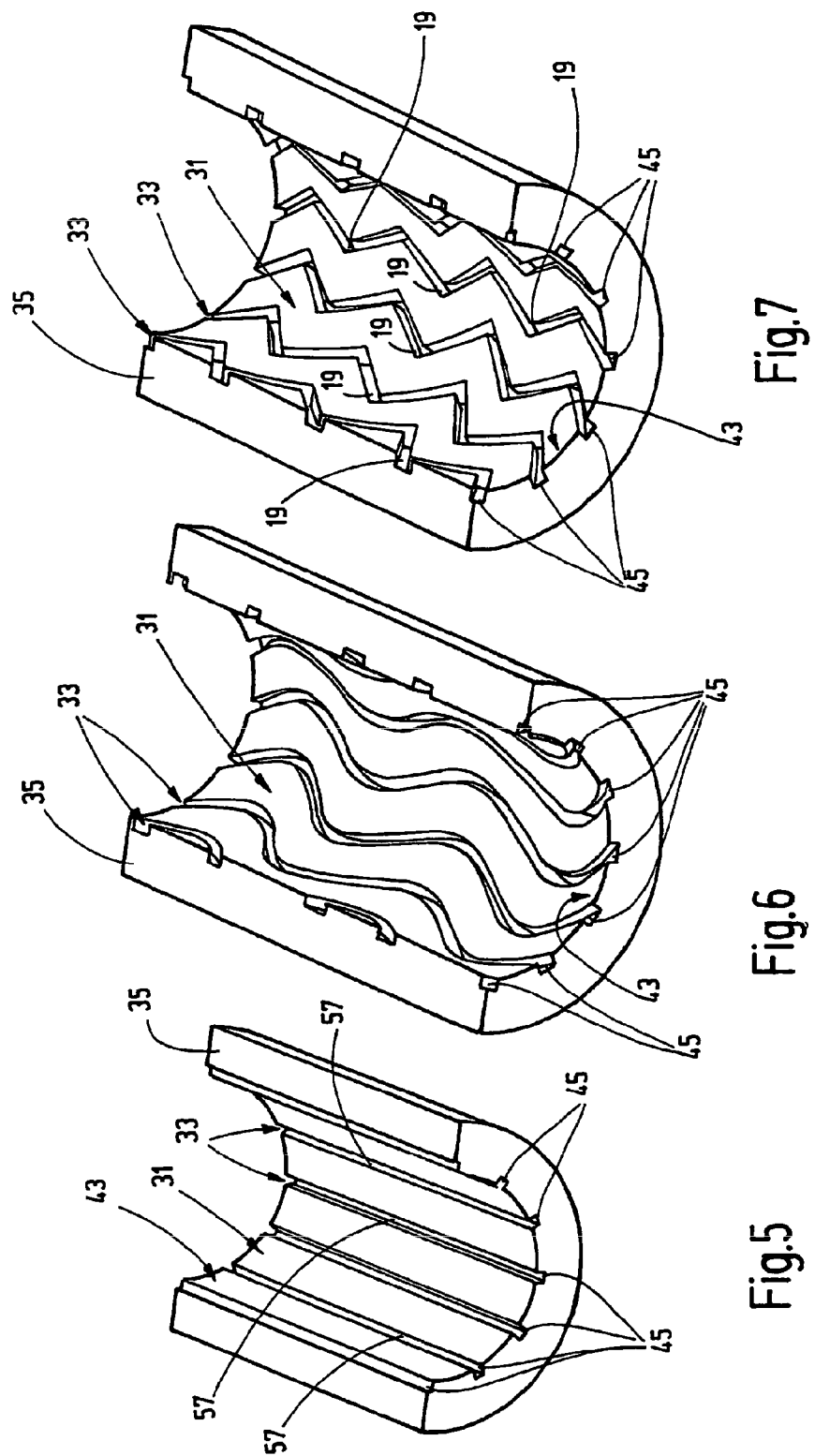

FILTER ELEMENT HAVING AT LEAST ONE MAT-TYPE OR SHEET-TYPE FILTER WEB

FIELD OF THE INVENTION

The invention relates to a filter element having at least one mat-type or sheet-type filter web that forms with its outside at least in part a peripherially enclosing filter jacket. Along the outside of the filter jacket, a surface configuration or modification takes place forming structures delimited from the remaining surface of the filter web. The structures are joined to the filter jacket and are formed with a prescribable contour and/or thickness.

BACKGROUND OF THE INVENTION

Filter elements for filtration of gaseous and liquid fluids are readily available on the market in a variety of embodiments. These filter elements are inserted into a filter housing and are used to clean supplied fluid that is laden with dirt particles, for example, in the form of a hydraulic medium, by using a mat-type or sheet-type filter web. The cleaned fluid from the filter housing is returned to the fluid circuit, in particular to a hydraulic circuit. In principle, the operational reliability of such hydraulic circuits and of the components included therein depends largely on the proper composition of the pertinent fluids circulated therein. Especially in higher-grade systems for economic reasons, suitable filter devices need to be provided for the media and fluids under consideration to be able to reliably remove impurities that occur in operation. In the case of the filter elements mentioned, assembling mat-type or sheet-type filter webs from different filter materials and folding or pleating at least part of the surface areas thereof is generally known to produce folded or pleated filter mats therefrom, which are placed in particular around a support tube provided with passages. To protect them from damage, such filter elements are provided on their outer periphery with suitable protective devices, such as a fine wire mesh that follows, in particular, the folding pattern of the filter mat. In lieu of finely woven wire mesh, placing fiber structures, such as fabric bands, around the outer periphery of such a filter element is known to thereby obtain protection against damage to the mat-type or sheet-type folded or pleated filter mats. Joining of the filter mat to the wire mesh or even to fabric bands is elaborate and expensive, and does not guarantee in every case that the filter mat is protected from mechanical damage. Such additionally applied protective devices also tend to become detached or to delaminate, in particular when the direction of fluid inflow at the filter element reverses, for example in the case of a backwash process. The known protective devices, such as the wire mesh mentioned or textile fiber structures, such as bands, furthermore have the shortcoming that the flow and filtration characteristics thereof, as compared to sensitive filter materials made of polyester, fiberglass or paper web, are very different and sometimes inferior. Such protective devices generally do not provide any defined pre-filtering effect.

DE 10 2005 014 360 A1 shows and describes a filter element having a filter material that is folded in a star shape and has individual filter folds. At least one fluid-permeable support extends at least partially in the space between two adjacent filter folds, at the inner or outer periphery relative to the filter folds. The support is provided in particular with filter-active substances or is itself composed of these filter-active substances and can be used as a filtering aid. The fluid-permeable support has, in particular, a basic structure in the fashion of a support tube that surrounds the filter material of the filter element on the inner or outer periphery thereof. Embedded into the basic structure are filtering aids, such as bentonites, perlites, activated carbon, diatomaceous earth, and the like, which, as filter-active substances, are capable of preventing the filter element from becoming clogged with sludge, in that components in the fluid that are harmful to the fluid or to system elements are reliably separated.

WO 01/37969 shows and describes a fixing band, in particular in the form of an adhesive tape, that can be placed around a pleated filter medium to stabilize and fix individual filter folds of the pleated filter medium at their prescribable spacing relative to one another. This structure ensures that a predefined filter surface of the filter medium is durably provided. However, pre-filtration is not possible with this known solution.

These known filter elements are characterized in particular in that any functionality imparted thereto is realized by a manufacturing or work step using individual components that is not optimal in terms of its production time or material consumption.

From DE 693 16 647 T2, a filter element is disclosed that has a porous, thick-walled, integral, self-supporting resin-impregnated and resin-bonded fibrous, tubular filter structure, having:
a hollow core;
an inner shell made of a first large-pore porous medium adjacent to the hollow core; and
an outer shell made of a second small-pore porous medium, finer than the first porous medium and adjacent to the inner shell. The first and second porous media are resin-impregnated and resin-bonded. Fluid to be filtered in operation flows radially inward through the tubular filter structure.

To improve the quality grade of this known filter element, an incrementally graded porosity is provided, in such a manner that the pores are most numerous on the outside of the filter element, with the dimensions thereof being at their smallest there. Preferably, provisions are made to incorporate on the outside of the filter element, and thus in the outer filter jacket, depressions, as structures that then constitute along the longitudinal axis of the filter element individual rings extending parallel to one another.

For the manufacture of the known filter element, a fibrous material is mixed with water or with another suitable dispersant, to form a slurry. Then, one or more perforated molded bodies or dies are immersed in the slurry in a felting tank containing an aqueous fiber dispersion. By applying a vacuum to the interior of the molded bodies, the fibers are caused to simultaneously and evenly "grow" on the molded bodies, creating in this manner the structured outer contour of the filter jacket. The known ring-shaped structures appear as depressions in the filter jacket and, hence, in negative form. Because of the already uniform density pattern of the structures, imparting a special functionality is then not possible.

A relatively long time is taken until an appropriate fiber volume grows via the slurry process. Also, the slurry process can generally only be implemented in an elaborate manner.

SUMMARY OF THE INVENTION

An object of the present invention, is to provide an improved and optimal filter manufacture, in particular in terms of the manufacturing time and material consumption, where the filter functionality can largely be readily influenced, while maintaining the advantages of the known solution, for example, a high filter stability and filter quality.

This object is basically met according to the invention by a filter element, by a molding tool according and by a process involving the structures generated by a sprayed-fiber application and molding in a manner and in a sequence where first the structures and then the filter jacket, or in a reverse time sequence where first the filter jacket and then the structures, or where both the filter jacket and the structures simultaneously, are formed in negative or positive shape on the filter jacket. A simplified manufacture of the filter element according to the invention is achieved in a cost-effective manner, compared to the slurry process described above for forming the structures.

Owing to the sprayed-fiber application by a suitable nozzle applicator device and the molding, at least on the outside of the filter element composed of a mat-type or sheet-type filter web or of a plurality of such webs, a surface configuration or modification with structures of a varying, prescribable contour and/or density are formed on the filter web. The structures are spatially delimited from the remaining surface of the filter jacket, such that the outside is provided with a structuring in the sense of a functional surface that permits different functionalities, including but not limited to regions of increased strength, regions having embedded filtering, regions having different fluid-routing properties, or regions having specific appearance properties. Owing to the targeted incorporation of fiber material by a spray application process into the respective prepared mold surface, a molding process is created in which, in contrast to the known slurry process, the application of the fibers into the form can be controlled in a targeted manner. A very broad range of different filter elements then can be produced that differ in their functionality. The process can involve first creating as a depression in the outer filter jacket by the sprayed-fiber application in the mold and then, subsequently, the respective negative inside structure. The process may also be reversed in time sequence, depending on the design of the production mold, in such a manner that first the positive, projecting structure is formed and then subsequently the outer filter jacket. The delimitation between the filter jacket and structure involves the filter jacket basically occupying a larger or at least the same surface area as the respective structure to be formed in raised or recessed shape. When a plurality of spray nozzles of the molding tool is used for the fiber application, the structure and fiber material can be generated simultaneously at least in some regions thereof.

In a particularly advantageous embodiment of the filter element, the structures of prescribable contour and/or density arranged on the outside of the filter jacket are designed such that the structures are capable of determining or influencing at least to some degree the inflow or flow of the fluid through the filter element, in particular through the filter jacket, in the fashion of flow directing elements. The structures of prescribable contour are thus capable of exerting significant influence on the nature of the fluid flow at the filter element, to the effect that a flow direction and velocity of the fluid flow desired by the design and also the basic nature of the flow around and through the filter element—turbulent or laminar—can be set. In particular when the structures have an increased density compared to the remaining density of the mat-type or sheet-type filter web, they can be used at least to some degree for stiffening the filter jacket. This structure eliminates in particular the need to incorporate or arrange additional stiffening elements on the filter jacket for the purpose of increasing, for example, the dent resistance of the filter jacket.

Also advantageous is using the structures of prescribable contour and/or density on the outside of the filter web for creating pictorial, in particular numeric or alphanumeric elements, such as trademarks and the like. The structures may be depressions or raised areas that depict a trademark for the filter element, and the depressions or raised areas may form surfaces or lines for subsequent printing on the structures. The structures of prescribable contour and/or density in particular for stiffening purposes of the filter element or also for fluid routing purposes on the outside of the filter web can be in a linear or stripe shape. These linear or stripe-like structures may extend tangentially over the outside of the filter jacket or may extend in a substantially axial direction relative to the filter jacket. Advantageously, the linear or stripe-like structures can be oriented, at least predominantly, in the radial direction of the filter element on the outside of the filter web. The linear or stripe-like structures that, as mentioned, may extend radially and/or tangentially and/or axially, can also have breaks in the contour or orientation thereof. In a particularly preferred embodiment of the filter element, the linear or stripe-like structures have a spacing relative to each other on the outside of the filter jacket that is chosen to be constant.

In particular, for the depiction of pictorial symbols by the linear or stripe-like structures, the same may also intersect. However, advantageously the linear or stripe-like structures can be curved in an S-shaped or have a jagged shape. In principle, any other geometric design of the horizontal section or cross section or longitudinal section of the structures is possible. Advantageously the structures can then be designed to be disk-shaped or circular, particularly as disk-shaped or circular raised areas or depressions on the surface of the filter jacket. The outside of the filter jacket can be either the inflow or the outflow side of the filter element. Preferably, the structures of prescribable contour and/or density are an integral part of the filter web and of the outside of the filter web. Preferably the structures can be designed to be partially or completely as affixed components of the filter web.

To minimize the manufacturing effort and expense for the filter element, advantageously, in each case, the structures are formed of individual fibers of which preferably also the filter web is formed, at least in part. In addition to the filter web formed in this manner, one or a plurality of additional filter layers with or without supporting lattices or other support may form the filter element, depending on the purpose of the filter element. Altogether, a multi-layered design of the filter element may then be obtained. In particular, this arrangement makes possible, through a predefined and desired design (parameterization), an adjustment of the filtration of the fluid when flowing through the filter element with respect to filter fineness, direction of flow through the filter element and effect of filter aids on the fluid to be filtered.

In a particularly preferred embodiment, the filter element, with the filter web and optional additional filter layers and support lattices, is placed around a fluid-permeable support tube in the fashion of a cylindrical hollow element. A one-piece filter element is then formed in this manner as a replaceable part for a filter housing in a hydraulic system. All of the components of the filter element mentioned so far, in particular the filter web according to the invention, may be fixed between two end caps of the hollow element, such that a tradable assembly or tradable assemblies having differing structures of prescribable contour and/or density on the surface of a filter jacket can be created.

To minimize the manufacturing and in particular the installation time and expense for a filter element provided with the structures according to the invention, a molding tool for manufacturing the filter element is proposed. The molding tool comprises a mold with the mold surface having the delimited structures, but having at least the spatial delimitation of the structures, for the filter jacket of the filter element in the fashion of a positive or negative matrix. The mold surface designed in such a manner is thus capable of receiving the outside of the filter jacket in the sense of a negative-shape or positive-shape design moldable therefrom. Advantageously, in particular in the case of a complex overall shape of the filter element, the mold is formed of at least two identically sized mold halves. The mold halves when assembled define, at least partially, the delimited structures for the surface of the filter web. For manufacturing a filter element in tubular shape, advantageously the mold is designed to be tubular and to arrange on the inside of the mold, in particularly exclusively on the surface of the inside of the mold, the respective matrix for creating the delimited structures of prescribable contour and/or density for the filter web.

A mold designed in this manner, having a free space or a preferably cylindrical hollow space defined by the mold, is particularly suitable for applying on the inside thereof with the aid of a nozzle device having spinnerets, from which a plastic melt can be formed into individual fibers or filaments. A spun-bonded nonwoven then forms the surface of the filter web and substantially forms the filter web itself. The nozzle device can be formed, for example in the case of a substantially cylindrical mold, as a spraying pipe or nozzle bar having a series of spinnerets at predefined distances from one another in an axial or a radial direction. In this way, and assuming that the surface of the mold has self-releasing properties with respect to the applied fibers, a seamless layer or a seamless filter jacket can be created by continuous fiber application in axial and/or radial direction relative to the mold.

Owing to the adjustable fiber thickness, the fibers are very thin and therefore suited to permit a multi-layer continuous application of fibers or filaments created from a plastic melt (thermoplastic). The fibers or filaments that are applied while in a plastic state settle on the inside of the mold and on the mold components arranged therein in the fashion of a negative matrix for creating the delimited structures of prescribable contour and/or density for the filter web. The delimited structures—following a cooling and/or curing process—are permanently molded on the surface of the filter web. The nozzle device used for this purpose enables in particular the amount of fibers or filaments to be locally applied via the inside of the mold, and therefore, also the desired adjustment of the density of the filter web, to be chosen in particular in the region of the delimited structures. Regions of differing strength and/or regions of differing filter fineness can be created in this manner along the entire filter web. Altogether, the process according to the invention can be used to create in a simple manner a layer thickness of the filter web material forming the surface of the filter element, which can be specified within desired limits.

Advantageously, a layer thickness can be chosen between approximately 2 mm and 6 mm. To be able to use the filter web produced according to the invention, in particular as a pre-filter for the filter element, advantageously the filter thickness or the fiber density of the fibers or filaments applied to the inside of the mold can be varied in the proposed manner over the thickness of the filter web as well. Thus, for example, the fiber density can be chosen on the inflow side of the filter web to be lower than on the outflow side of the filter web. In this proposed manner, a one-piece filter web can be formed altogether that by itself forms a filter element. After cooling and solidification of the fibers or filaments in the mold, the filter element can be removed from the mold, in particular, by releasing the two or a plurality of mold elements, and reusing same for a renewed production process of a filter element according to the invention. The mold will need to be cleaned and/or the surface thereof will need to be treated with a release agent prior to applying a new filter web in the mold.

The process according to the invention for producing the delimited structures of prescribable contour and/or density and of the filter jacket can be used for creating filter elements that do not require any further finishing, in particular no finishing of the edge seam.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are schematic and are not to scale:

FIG. 3b is a perspective view of a mold of two mold halves according to the one shown in FIG. 3a;

FIG. 4a is a perspective view of a mold half for producing a filter element according to a third exemplary embodiment of the invention;

FIG. 4b is a perspective view of a mold formed of two identically sized mold halves according to the one shown in FIG. 4a; and FIGS. 5 to 8 are perspective views of a mold half for producing filter elements according to fourth, fifth, sixth and seventh exemplary embodiments of the invention, respectively.

DETAILED DESCRIPTION OF THE INVENTION

Figure 1:
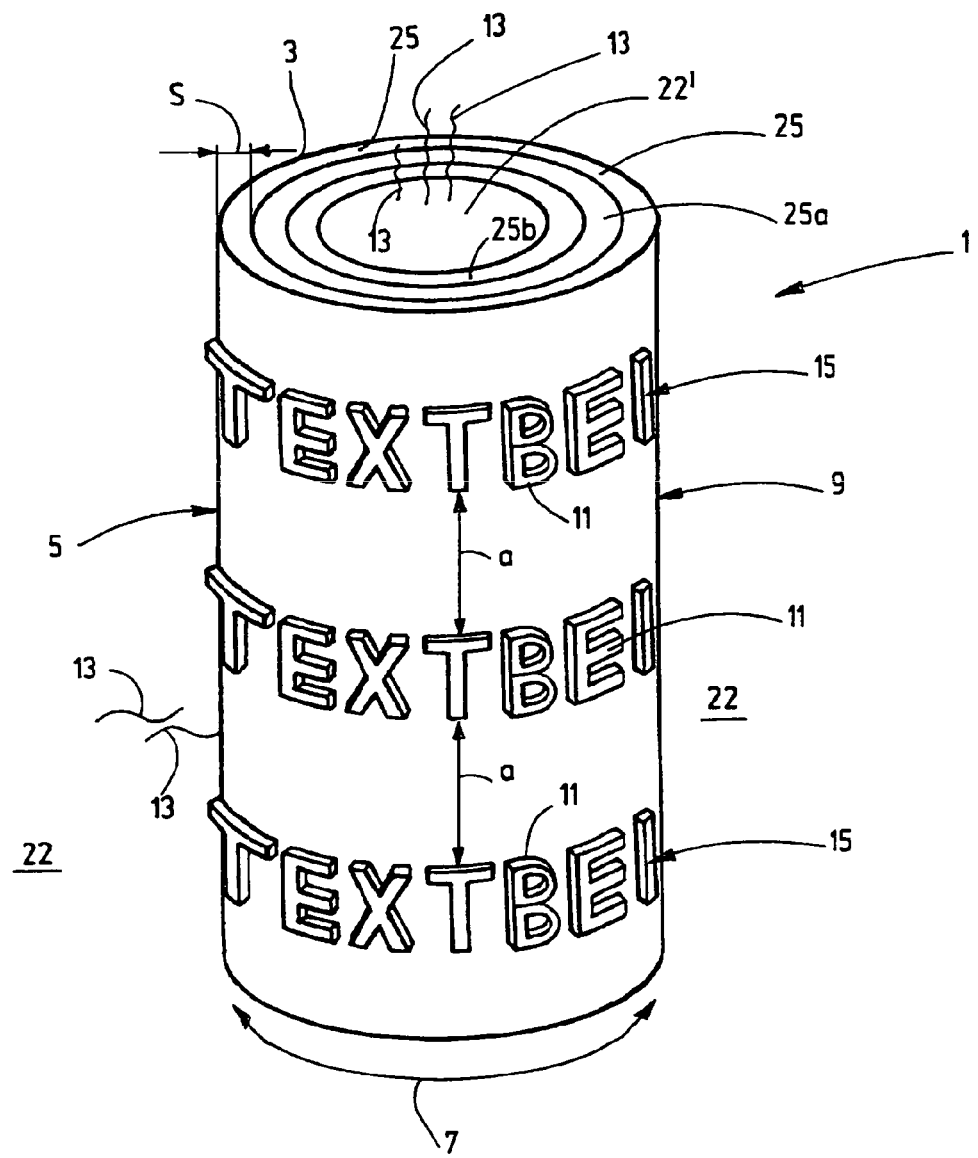
FIG. 1 is a perspective view of the filter element according to an exemplary embodiment of the invention with a fiber jacket.

FIG. 1 shows, in a schematic perspective view, a filter element 1 as it is used, for example, in suction filters or line filters for deep filtration of a gaseous or liquid fluid. The filter element 1 is designed to be hollow cylinder with approximately uniform outside and inside diameters over the axial length thereof. The filter element 1 is created in a spray application process (SpunSpray process) of fibers that are applied with the aid of a process shown in FIG. 2 of applying a plastic melt by a nozzle device 39 onto an inside 41 of a mold 29. The filter 1 is formed as a one-piece component created by continuous application of individual fibers 23 onto a mold surface 31 of the mold 29. The individual fibers are applied in randomized or regular arrangement relative to one another over the thickness of the entire filter element. The filter element 1 has a filter web 3 that is formed in the stated manner as a fiber mat of individual fibers 23. The outside 5 filter web 3 forms in the embodiment shown in FIG. 1 the inflow side 22 of the filter element 1, for fluid to be cleaned. The filter web 3 forms a filter jacket 7 that is closed around its periphery and extends around the entire filter element 1.

As is also shown in FIG. 1, the filter element 1 is built up by layering altogether three filter layers 25, of which the filter web 3 forms the outermost filter layer. The individual filter layers 25 have, in the embodiment shown in FIG. 1, a layer thickness S of approximately 2 mm to 4 mm in each case. A surface 9 of the filter web 3 shows, arranged about the periphery of the filter web 3, a delimited positive, projecting structure 11 formed as a pictorial symbol 15. The pictorial symbol 15 or delimited structure 11 is placed along the entire axial length of the filter element 1 at predefined distances a from one another. The filter web 3 and the pictorial symbols 15 are produced from the same material, namely a thermoplastic, such as polyamide, polypropylene, polyacrylic, or the like and are produced in a single process step. The density of the chosen fiber material basically does not differ within the pictorial symbol 15 and within the filter web 3. The pictorial symbol 15 or delimited structure 11 has a greater geodetic height than the remaining outside 5 of the filter web 3. This pictorial symbol 15 allows the pictorial symbols 15 to be provided with a color contrasting from the surface 9 of the filter web 3 with the aid of a simple printing process. This merely requires, for example, rolling the outside 5 of the filter element 1 onto a straight, level dye holder for printing the pictorial symbols 15.

As is also shown by FIG. 1, the filter element 1 has an additional, radially further inwardly located filter layer that has a greater filter fineness than the filter web 3. The further inwardly located filter layer 25a is, like the radially further inwardly located filter layer 25b adjoining same, formed in a single process step together with the filter web 3, in a SpunSpray process. The individual fibers 23 of the respective filter layers 25a and 25b lie randomized one on top of the other, like in the filter layer 25 or in the filter web 3, with the filter layer 25 having the greatest filter fineness of all three filter layers shown. Fluid 13, for example hydraulic oil, is routed in the operation of the filter element 1 through fluid-routing devices within a filter housing (not shown) in which the filter element 1 is housed, to the inflow side 22 of the filter element 1 and passes through the filter layers 25 to 25b, in order to exit, after passing through a support pipe (not shown) in the interior of the filter element 1, at the outflow side 22' of the filter element 1 from the filter element 1 and be returned purified to a hydraulic circuit. However, the filter element 1 can also be formed of only one peripheral layer of individual fibers.

Figure 2:
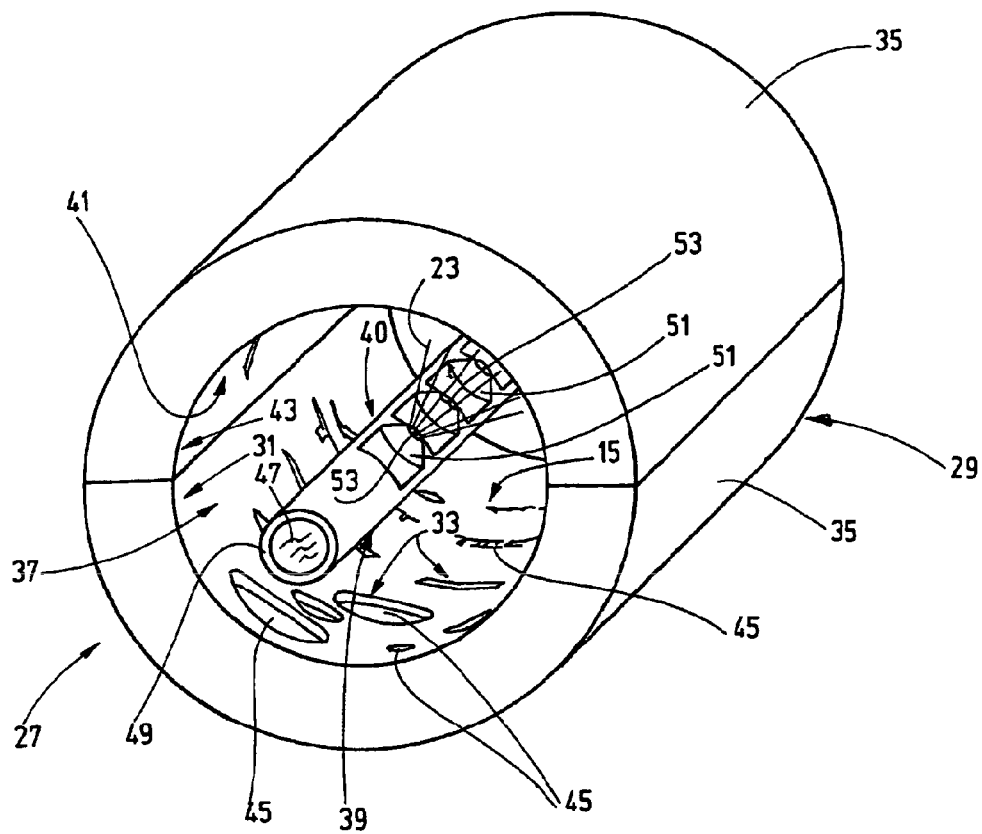
FIG. 2 is a perspective view of a molding tool according to an exemplary embodiment of the invention for producing a filter element comparable to the solution according to FIG. 1.

FIG. 2 shows, in an embodiment shown merely by way of example, a molding tool 27 for producing a filter element 1 as shown in FIG. 1. In principle, the molding tool 27 has two essential components, namely a hollow cylindrical mold 29 formed of two identically sized mold halves 35, and the nozzle device 39. The mold halves are formed, simplified, as thick-walled cylinder halves in which, for example, a cooling device for cooling the inside 41 thereof, may be arranged. The mold halves 35 are provided with suitable fixing devices that are not shown in any detail, to releasably connect them one to the other without offset, but form-locking.

The inside 41 of the mold halves 35 has self-releasing properties in respect of the material of the filter web 3. Provided in the surface 43 of the inside 41 of each mold half 35 is a negative matrix 33 in the fashion of milling grooves or other recesses, which is a mirror image of the pictorial symbol 15 shown in FIG. 1 on the filter web 3. In the viewing direction of FIG. 2, the matrix 33 is formed on the right by the pictorial symbols 15 in such a way that the pictorial symbols 15 in FIG. 1 are mirror-image recesses 45 in the mold surface 31 or surface 43 of the inside 41 of each mold half 35. The matrix 33 is formed, in the viewing direction of FIG. 2 on the left, by circular disk-shaped depressions 21, likewise in the form of recesses of identical depth extending over the entire region of the depressions 21. As shown, the two mold halves 35 thus form a hollow cylinder, such that a cylindrical free space 37 is created in the radial direction between the mold halves 35.

The nozzle device 39 is formed substantially by a nozzle bar 40 of a pipe 49 transporting plastic melt 47. On the nozzle bar 40, spinnerets 51 are arranged evenly spaced for forming the individual fibers 23. In the embodiment shown, the nozzle openings 53 of the spinnerets 51 create the individual fibers 23 hydraulically by application of pressure on the plastic melt 47, and direct the fibers nearly perpendicularly onto the surface 43 of the inside 41 in each mold half 35 for the spray application. The nozzle bar 40 is moved by a servomotor device (not shown in any detail) in the axial direction of the mold 39, a rotatory movement of the nozzle bar 40 being superposed on the axial movement, such that the individual fibers 23 are sprayed randomized onto the surface 43.

For improved fanning of the plastic-melt stream and for transporting the individual fibers 23 to the surface 43, use of a carrier air flow can be advantageous.

The structures 11 and all of the filter layers 25, 25a, 25b, and therefore also the filter web 3 that bears on its outside 5 the structures 11, are thus produced in a single process step by applying the individual fibers 23 in the stated manner. Alternatively or additionally, the mold may also move relative to the nozzle bar 40.

After completed application of the individual fibers 23 and formation of the desired filter layers, and after a setting or solidification process of the filter layers 25, 25a and 25b, the mold halves 35 shown can be moved radially apart after releasing the corresponding form-locking connection that has a centering function. The filter element 1 then can be removed. The filter element 1 is characterized by an adequate stiffness for its intended purpose. The additional figures show measures, inter alia, for improving the stiffness of the filter element 1. FIG. 3a, for example, shows in a schematic perspective view a mold half 35, in the interior surface 43 of which spiral-shaped recesses 45 are recessed that are provided with a low pitch and have uniform rectangular cross sections.

Figure 3B:
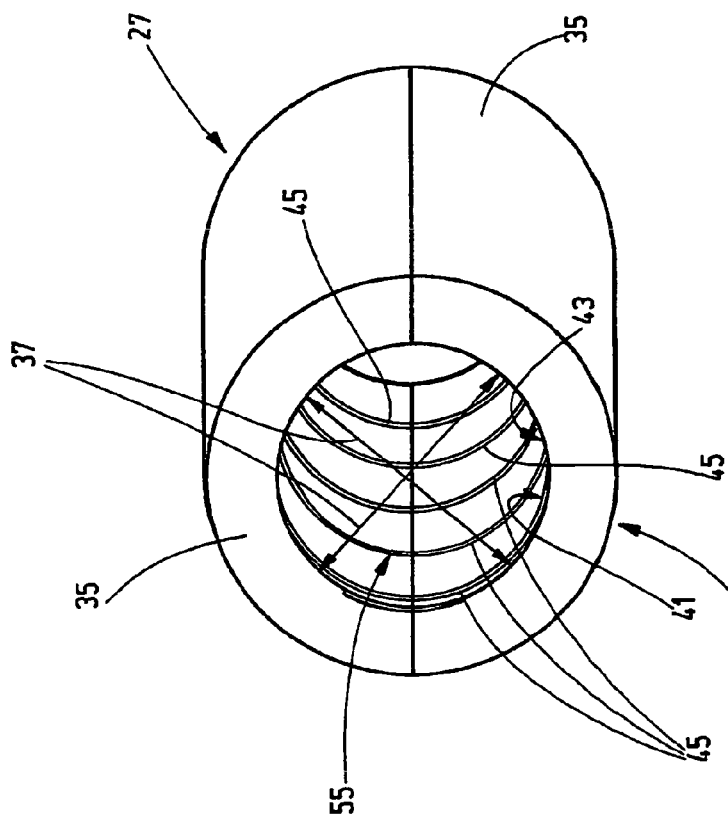
Figure 3A:
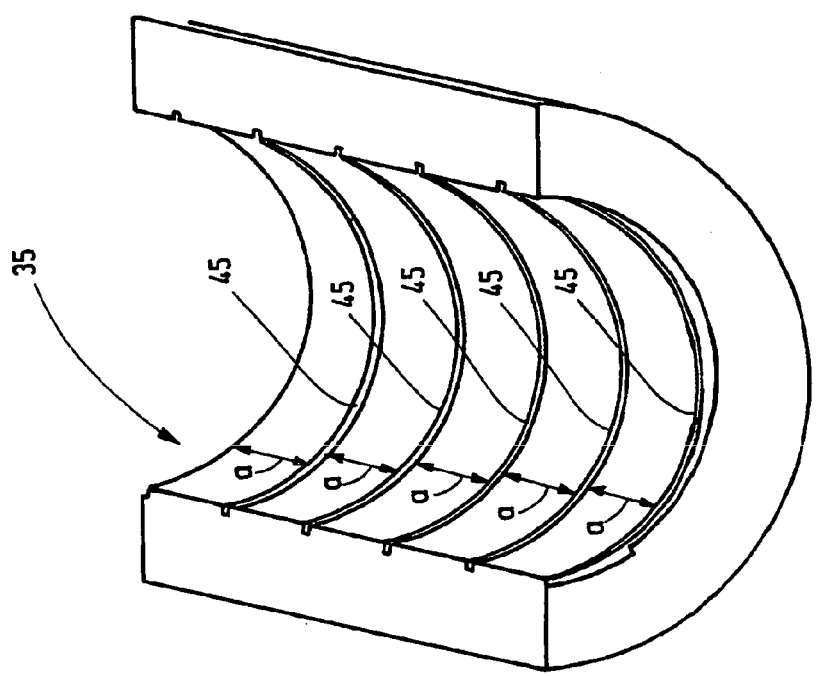
FIG. 3a is a perspective view of a mold half of a mold for producing a filter element according to a second exemplary embodiment of the invention.

The recesses 45 in the fashion of lines or stripes have identical axial distances from one another such that, as shown in FIG. 3 in a further perspective view of a mold 29, they form an endless circumferential spiral shape when the mold halves 35 are joined. When a filter element 1 is produced by a manufacturing process shown in FIG. 2 by applying individual fibers 23 in the manner described, a filter element 1 is obtained. The outside 5 of that filter web 3 has a surface 9 that has a spiral 55 radially projecting out from its surface 9. The spiral 55 thus formed is a delimited structure 11 that is capable of contributing both to the radial and/or to the axial stiffening of the filter element 1 and to the fluid routing on the surface 9 thereof. Identical components are identified by the same reference numerals as in the preceding figures.

The mold may also be formed in one piece, comprising, for example, of a hollow cylindrical injection mold. The filter element is capable of being removed from the mold due to its flexibility. The filter element can also be removed by destroying the mold.

As shown in FIGS. 4a and 4b, recesses 45 may also be provided in the fashion of wrap-around rectangular grooves in the surface 43 of the inside 41 of each mold half 35 of the mold 1, for producing delimited structures 11 on the surface 9 of a filter element 1. The recesses 45, which are shown in FIGS. 4a and 4b, each extend at an acute angle relative to one another, substantially radially relative to each mold half 35 and intersect tangentially approximately in the center of each inside 41 of each mold half 35, as shown in FIG. 4b. The recesses 45 in their totality then form a wrap-around shape.

Accordingly, when producing a filter element in the mold 29 shown in FIG. 4b, a structure 11 having an intersecting stripe-like shape is formed on the surface 9 of the filter web 3 of the given filter element 1. Such a structure 11 serves mainly for axial and radial stiffening of the filter element 1.

FIG. 5 shows in a further perspective schematic view of a mold half 35 for a mold for producing a filter element 1 a further possible embodiment of the surface 43 on the inside 41 of the respective mold half 35. Here, even-running recesses 45 in axial direction are shown that have a rectangular cross-section that remains uniform over the axial length. These longitudinal webs 57 represent a negative matrix 33 that forms, after molding of a filter element in the respective mold, longitudinal ribs on the surface of the filter element that are arranged with uniform tangential spacing about the periphery of the filter element 1. This arrangement results, in particular, in an improved buckling and bending stiffness of the respective filter element 1. Additionally, fluid routing channels that are of rectangular shape when viewed in cross section are created at the inflow side 22 of a respective filter element 1, between the structures 11 designed as longitudinal ribs of a filter element 1 originating from the mold half or from the mold 29. Therefore, a design of the mold in the fashion shown in FIG. 5 facilitates a longitudinal routing along the outside of the filter web 3, of the fluid 13 flowing towards the filter element 1.

As shown in FIG. 6 in a further perspective schematic view of a mold half 35 of a further embodiment of a mold 29, the recesses 45 in the surface 43 of the inside 41 of the respective mold half 35 may also have a horizontal-section shape that is curved in an S-shape. Advantageously, as shown in FIG. 7, the respective recesses 45 can have a jagged horizontal-section shape. The embodiment of a mold half 35 shown in FIG. 6 produces a surface 9 of the filter web 3 of a filter element 1 formed therefrom that is capable of slowing the fluid 13 flowing therethrough and allowing it to flow in a laminar flow pattern along the filter element 1. The direction changes 19 of the structures 11 that are formed when a filter element is molded in the mold shown in FIG. 7, can contribute to producing turbulence and slowing the fluid flow at the surface 9 of the filter web 3.

Figure 8:
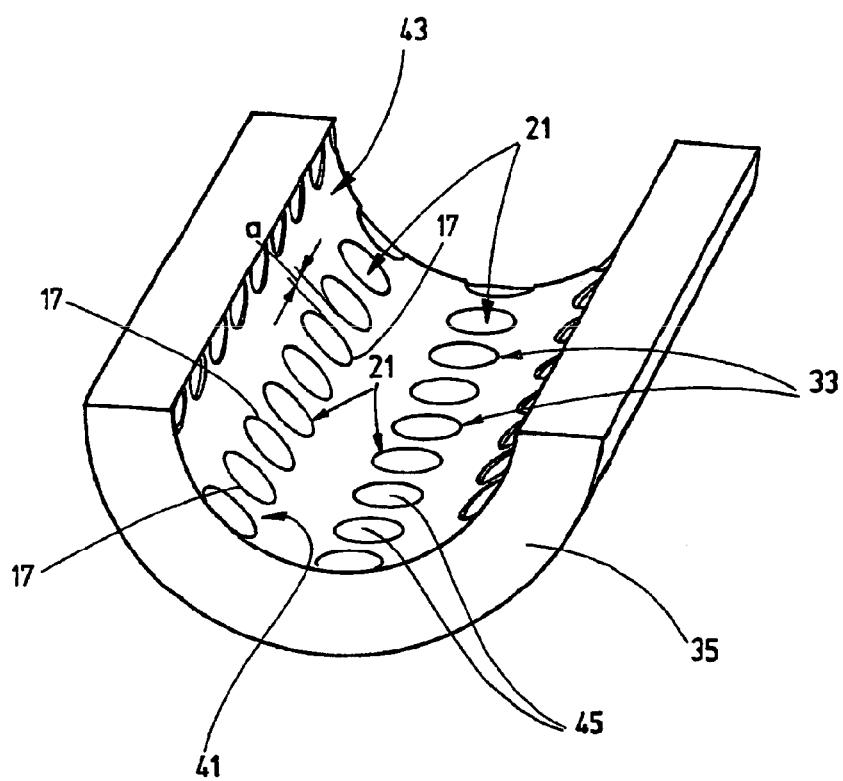

FIG. 8 shows, in a further schematic perspective view, a mold half 35 for a mold 29 for creating a filter element 1, the surface 43 of which has lined-up or aligned circular-disk-shaped recesses, along the longitudinal axis of the mold, having a uniform depth of recess that remains constant over the entire surface of each recess 45. The circular-disc shaped recesses 45 have uniform axial distances a from each other. When a filter element 1 is molded in the respective mold 29, structures 11 are then formed on the surface 9 of the filter element 1 that have breaks relative to each other. Circular-disk-shaped structures of this type are preferably capable of generating different pressure differentials over the entire periphery of a filter element 1 when fluid 13 passes through the filter element.

It is understood that the embodiments of the matrix 33 shown in all of the figures can be designed not only as recesses 45, but also partially or completely in the form of raised areas projecting out from the surface 43 of the inside 41 of each mold half 35.

During the manufacturing process of a filter element 1 in the manner shown, additional filtering aids with chemical and/or physical action mechanisms can be integrated into the different filter layers 25, 25a and 25b.

While various embodiments have been chosen to illustrate the invention, it will be understood by those skilled in the art that various changes and modifications can be made therein without departing from the scope of the invention as defined in the claims.

The invention claimed is:

1. A filter element, comprising:
at least one of a mat-shaped or sheet-shaped filter web;
a filter jacket with an outside surface; and
a surface configuration along said outside surface including structures delimited and extending from and joined to remaining part of said outside surface of said filter jacket, said structures being formed in a prescribed contour and thickness and being generated by a spray-fiber application and shaping in at least one time sequence of first said structures and then said filter jacket, of first said filter jacket and then said structures, or of simultaneously both said filter jacket and said structures, said structures forming at least one of a negative or a positive shape on said filter jacket, said filter web, said filter jacket and said structures being a unitary one-piece component of a same material created by continuous application of individual fibers onto a surface of a mold and being permeable with a filtering capacity.

2. A filter element according to claim 1 wherein said structures comprise a negative shape design of depressions in said filter jacket.

3. A filter element according to claim 1 wherein said structures comprise a positive-shape design of raised areas on said filter jacket.

4. A filter element according to claim 1 wherein one of said structures transitions from a depression into a raised area.

5. A filter element according to claim 1 wherein said structure comprise one raised area spaced from another raised area on said filter jacket.

6. A filter element according to claim 1 wherein said structures have at least one of a contour and density determining or influencing fluid flow relative to said filter jacket.

7. A filter element according to claim 1 wherein said structures have at least one of a contour or density effecting stiffening of said filter jacket in at least one of an axial or a radial direction.

8. A filter element according to claim 1 wherein said structures having at least one of a contour or density with at least one of numeric or alphanumeric elements.

9. A filter element according to claim 1 wherein said structures have a linear shape.

10. A filter element according to claim 9 wherein said structures extend substantially axially and parallel to a longitudinal axis of said filter jacket.

11. A filter element according to claim 9 wherein
said structures comprise at least one of axially oriented breaks or direction changes.

12. A filter element according to claim 9 wherein
said structures are spaced by a predetermined distance from one another.

13. A filter element according to claim 9 wherein
said structures intersect at least in some areas.

14. A filter element according to claim 9 wherein
said structures at least one of curved in S-shapes or are jagged.

15. A filter element according to claim 1 wherein
said structures are at least one of disk-shaped or circular raised areas or depressions on said filter jacket.

16. A filter element according to claim 1 wherein
said structures are on at least one of an inflow side or an outflow side of the filter element.

17. A filter element according to claim 1 wherein
said filter web comprises multiple layers.

18. A filter element according to claim 17 wherein
said structures and said filter web are composed of a same group of individual fibers.

19. A filter element according to claim 1 wherein
additional filter layers are coupled to said filter web.

20. A filter element according to claim 19 wherein
support lattices are coupled to said filter web and said additional layers.

21. A filter element according to claim 20 wherein
said filter web, said additional filter layers and said lattices form a cylindrical hollow element around a support tube and extend between two end caps, forming a tradable component.

22. A molding tool for producing a unitary filter element of a filter web, a filter jacket, and positive or negative structures of a prescribed contour and thickness on an outer surface of the filter jacket, comprising:
   a body having a mold surface and having two identically sized mold halves;
   a delimited profile of at least one of projections or recesses on said mold surface for forming the filter jacket and structures when the mold halves are assembled together to define the structures on the filter jacket; and
   a nozzle applying individual fibers formed from a plastic melt on said mold surface.

23. A molding tool according to claim 22 wherein
said body is tubular with said mold surface on an inside thereof having a matrix of said delimited profile on said mold surface of a prescribed contour and density.

24. A molding tool according to claim 23 wherein
said nozzle is inside a free space in said body.

25. A molding tool according to claim 24 wherein
said nozzle is arranged on at least one of a spraying pipe or nozzle bar extending axially through said free space of said body.

26. A process for producing a unitary filter element of a filter web, a filter jacket and positive or negative structures of a prescribed contour and thickness on an outer surface of the filter jacket, comprising the steps of:
   forming fibers from a solid parent material converted into a melt;
   continuously spraying the fibers onto a mold surface of a mold having two identically sized mold halves, with a delimited profile of at least one of projections or recesses on the mold surface; and
   forming the filter element in the mold from the fibers with the filter jacket having at least one of the positive or negative structures.

27. A process according to claim 26 wherein
the fibers are sprayed through a nozzle onto the mold surface that is located inside the mold.

28. A process according to claim 27 wherein
the fibers are applied continuously in at least one of an axial direction or a radial direction relative to the mold through the nozzle.

29. A process according to claim 26 wherein
the fibers are applied continuously onto the mold surface to produce a prescribable layer thickness of material forming the outer surface of the filter jacket.

30. A process according to claim 29 wherein
the layer thickness is approximately 2 mm to 6 mm.

31. A process according to claim 26 wherein
at least one of the outer surface or the structures on the filter jacket have at least one of a lesser or greater filter fineness than a filter web attached to the filter jacket and formed by continuous spraying of the fibers.

* * * * *